(12) United States Patent
Zhang et al.

(10) Patent No.: US 9,199,338 B2
(45) Date of Patent: Dec. 1, 2015

(54) TUBE WELDING ROD RESISTANT TO HIGH STRESS ABRASION

(75) Inventors: Liehua Zhang, Hubei (CN); Quansheng Song, Hubei (CN)

(73) Assignee: KINGDREAM PUBLIC LIMITED COMPANY, Wuhan, Hubei (CN)

( * ) Notice: Subject to any disclaimer, the term of this patent is extended or adjusted under 35 U.S.C. 154(b) by 8 days.

(21) Appl. No.: 14/352,146

(22) PCT Filed: Nov. 2, 2011

(86) PCT No.: PCT/CN2011/081664
§ 371 (c)(1),
(2), (4) Date: Apr. 16, 2014

(87) PCT Pub. No.: WO2013/063768
PCT Pub. Date: May 10, 2013

(65) Prior Publication Data
US 2014/0305922 A1   Oct. 16, 2014

(51) Int. Cl.
*B23K 35/32* (2006.01)
*B23K 35/22* (2006.01)
*B23K 35/02* (2006.01)
*C21D 9/22* (2006.01)
*C21D 1/06* (2006.01)

(52) U.S. Cl.
CPC ............ *B23K 35/228* (2013.01); *B23K 35/0266* (2013.01); *B23K 35/327* (2013.01); *C21D 1/06* (2013.01); *C21D 9/22* (2013.01)

(58) Field of Classification Search
CPC .... B23K 35/02; B23K 35/0244; B23K 35/12; B23K 35/362; B23K 35/30; B23K 35/228
See application file for complete search history.

(56) References Cited

U.S. PATENT DOCUMENTS

| 5,944,127 A | 8/1999 | Liang et al. |
| 6,248,149 B1 | 6/2001 | Massey et al. |
| 2005/0109545 A1 | 5/2005 | Lockwood et al. |

FOREIGN PATENT DOCUMENTS

| CN | 1562550 A | 1/2005 |
| CN | 101380698 A | 3/2009 |
| CN | 101595233 A | 12/2009 |

OTHER PUBLICATIONS

Machine translation of CN 101380698 performed Jun. 17, 2015.*
State Intellectual Property Office of P. R. China (ISR/CN), "International Search Report", Aug. 9, 2012, China.

* cited by examiner

*Primary Examiner* — Brian Jennison
(74) *Attorney, Agent, or Firm* — Tim Tingkang Xia, Esq.; Locke Lord LLP

(57) ABSTRACT

A tube welding rod resistant to high stress abrasion is used for hard facing of an abrasion-resistant layer, and comprises a welded tube and a filler filling the welded tube. The filler comprises, in weight percentages, 65-90% of spherical sintered tungsten carbide particles, 5-30% of spherical cast tungsten carbide particles, 0-15% of mechanically ground cast tungsten carbide particles, 2-6% of alloy power, and 0.2-1% of an organic binder. The used of the mixed spherical sintered tungsten carbide particles and the spherical cast tungsten carbide particles improves the abrasion resistance performance of the hard-faced layer in the high stress working condition, improves the overall abrasion resistance of the abrasion-resistant hard-faced layer formed by the welding rod, and is suitable for surface hardening of bits.

9 Claims, 1 Drawing Sheet

TUBE WELDING ROD RESISTANT TO HIGH STRESS ABRASION

FIELD OF THE INVENTION

The present invention relates to a tube welding rod resistant to high stress abrasion, used as deposit welding of wear-resistant layers. The tube welding rod is particularly suitable for use under working conditions of high stress abrasion, can be used for surface hardening of cone rock bits and diamond bits, and also can be used for surface hardening of other iron and steel materials.

BACKGROUND OF THE INVENTION

With advancement in geological exploration drilling technologies, the requirements for the performance of drilling tools used in oil drilling are higher and higher, and the working conditions the oil drilling bits deals with are increasingly complex and poor. Accordingly, the requirements for wear resistance of wear-resistant deposit-welding layers on the bits are higher and higher.

There are multiple areas on the bits that require improvement on wear resistance. In terms of working conditions and wear resistance of the bit, on the one hand, high wear resistance under low stress is required, which usually can be measured and evaluated based on ASTM G65 standard; on the other hand, high wear resistance under high stress is required, which usually can be measured and evaluated based on ASTM B611 standard. According to complexity of the working conditions of the bit, different parts of the bit can be applied with different deposit-welded welding rods that have different performance characteristics, such that the overall performance of the bit can be improved. For wear-resistant tube welding rods under high stress, a wear-resistant phase of the filler in the wear-resistant tube welding rods has undergone continuous improvement of sintered tungsten carbide particles, spherical sintered tungsten carbide particles, and the combination of spherical sintered tungsten carbide particles and crushed cast tungsten carbide. Chinese Patent No. 200810155754.9 proposes a technology using the combination of spherical sintered tungsten carbide particles, surface treated cast tungsten carbide, and spherical cast tungsten carbide, so that the performance of such a type of tube welding rod has been greatly improved. However, it is still an urgent need to further design optimized welding rod filler to enhance and perfect the wear resistance and welding property of the tube welding rod under high stress state.

SUMMARY OF THE INVENTION

In one aspect, the present invention is directed to a tube welding rod with high wear resistance that is resistant to high stress abrasion.

In one embodiment, the tube welding rod includes a welding tube and a filler filled in the welding tube. The filler includes spherical sintered tungsten carbide particles, spherical cast tungsten carbide particles, crushed cast tungsten carbide particles, alloy powder, and an organic binder. The weight percentages of the components are as follows: 65%-90% of the spherical sintered tungsten carbide particles, 5%-30% of the spherical cast tungsten carbide particles, 0%-15% of the crushed cast tungsten carbide particles, 2%-6% of the alloy powder, and 0.2%-1% of the organic binder.

In one embodiment, the spherical sintered tungsten carbide particles are formed by uniformly mixing tungsten carbide powder with cobalt powder into spherical particles and then sintering the spherical particles. The weight percentage of cobalt is 2%-6%, and the particle size of the spherical sintered tungsten carbide particles is 10-40 mesh by the U.S. Standard Sieve Series mesh sizes.

In one embodiment, the particle size of the spherical cast tungsten carbide particles is 30-200 mesh by the U.S. Standard Sieve Series mesh sizes. The main chemical compositions of the spherical cast tungsten carbide particles are, by weight percentage, 95.00% or greater of tungsten, 3.85%-4.0% of carbon, 0.15%-0.50% of iron, 0.10%-0.20% of chromium, and 0.10%-0.20% of vanadium.

In one embodiment, the alloy powder includes iron, silicon, manganese, niobium, and nickel, and the weight percentages of the components are: 12%-20% of iron, 10%-16% of silicon, 45%-53% of manganese, 5%-15% of niobium, and 5%-15% of nickel.

In one embodiment, the weight percentages of the welding tube and the filler are 20%-35% of the welding tube and 65%-80% of the filler.

In one embodiment, the welding tube is formed by rolling of low carbon steel sheet, and carbon content of the low carbon steel is less than or equal to 0.20% by weight.

In one embodiment, the organic binder is phenolic resin.

Certain embodiments of the present invention, among other things, have the following beneficial advantages.

1. Spherical cast tungsten carbide in the filler is used as a main strengthening phase. On the one hand, the spherical cast tungsten carbide replaces the mechanically crushed cast tungsten carbide in the related art, thereby greatly improves hardness and wear resistance. Comparing the spherical cast tungsten carbide with the mechanically crushed cast tungsten carbide or the cast tungsten carbide undergoing surface carburization treatment, firstly, due to differences in the geometric shape, bearing capacity and impact resistance of the spherical cast tungsten carbide are greatly improved; secondly, the hardness of the spherical cast tungsten carbide is higher, the hardness of the mechanically crushed cast tungsten carbide and the cast tungsten carbide undergoing surface carburization treatment usually is HV2200-2500, while the hardness of the spherical cast tungsten carbide is HV2600-3600, and thus the spherical cast tungsten carbide has greater capability to withstand high stress than the mechanically crushed cast tungsten carbide or the cast tungsten carbide undergoing surface carburization treatment, has higher wear resistance, and is more suitable for use in the high stress state. On the other hand, the shape of the spherical cast tungsten carbide particles is much closer to that of the spherical sintered tungsten carbide particles, which is beneficial for the grading match between the two types of particles and for the optimal combination of the two types of particles.

2. The spherical sintered tungsten carbide particles with lower cobalt content is used in the filler, and the proportion of the spherical sintered tungsten carbide particles applied is large. The spherical sintered tungsten carbide particles are the main wear-resistant phase in the tube welding rod resistant to high stress abrasion, and reduction of cobalt content in the spherical sintered tungsten carbide particles can further improve hardness and wear resistance of the spherical sintered tungsten carbide particles. Meanwhile, increasing the amount of the spherical sintered tungsten carbide particles used is beneficial for improving the bearing capacity of the deposit-welding layer against high stress.

3. The composition of the alloy powder in the filler is adjusted. Optimal combination of iron, silicon, manganese, niobium, and nickel ensures that the tube welding rod shows good welding property during welding.

4. The present invention not only ensures the welding property of the tube welding rod, but also improves the wear resistance of the deposit-welding layer of the tube welding rod under various working conditions, and particularly improves the wear resistance of the deposit-welding layer of the tube welding rod under high stress conditions. Accordingly, the tube welding rod of the present invention is suitable for surface hardening of cone rock bits and diamond bits, and is also useful for surface hardening of other iron and steel materials.

5. The mechanically crushed cast tungsten carbide particles are used to partially replace the spherical cast tungsten carbide particles. The amount of the mechanically crushed cast tungsten carbide does not exceed that of the spherical cast tungsten carbide particles, which will slightly reduce the wear resistance of the welding rod, but can decrease the manufacturing cost of the welding rod.

Several tube welding rods are designed and produced according to certain embodiments of the present invention. The welding property of the tube welding rods is evaluated, and the wear resistance of the deposit-welding layer is measured and evaluated based on ASTM G65 and ASTM B611 standards. Those properties are also compared with the properties of existing tube welding rods with advanced performance, and the results are as follows.

A reference welding rod in the related art: welding property, qualified; ASTM B611 wear quantity, 0.5362 gram (g); ASTM G65 wear quantity 0.5996 g.

A welding rod according to a first embodiment of the present invention: welding property, qualified; ASTM B611 wear quantity, 0.4056 g; ASTM G65 wear quantity 0.5378 g. Comparing with the reference welding rod, the welding rod in the first embodiment has a 32.2% increase in ASTM B611 wear resistance, and a 11.5% increase in ASTM G65 wear resistance.

A welding rod according to a second embodiment of the present invention: welding property, qualified; ASTM B611 wear quantity, 0.3747 g; ASTM G65 wear quantity 0.4887 g. Comparing with the reference welding rod, the welding rod in the second embodiment has a 43.1% increase in ASTM B611 wear resistance, and a 22.7% increase in ASTM G65 wear resistance.

A welding rod according to a third embodiment of the present invention: welding property, qualified; ASTM B611 wear quantity, 0.4065 g; ASTM G65 wear quantity, 0.5112 g. Comparing with the reference welding rod, the welding rod in the third embodiment has a 31.9% increase in ASTM B611 wear resistance, and a 17.3% increase in ASTM G65 wear resistance.

BRIEF DESCRIPTION OF THE DRAWINGS

In FIG. 1, the bigger bright part denotes a spherical sintered tungsten carbide particle, the small black round part denotes a spherical cast tungsten carbide particle.

In FIG. 2, the bigger round gray part denotes a spherical sintered tungsten carbide particle, the small black round part denotes a spherical cast tungsten carbide particle, and the irregular black part denotes a mechanically crushed cast tungsten carbide particle.

DETAILED DESCRIPTION OF THE INVENTION

Embodiment 1

Figure 1:
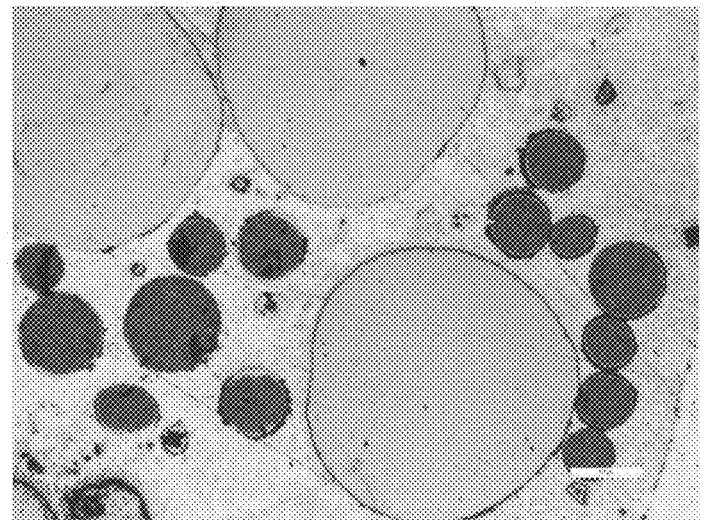
FIG. 1 is a photomicrograph of a deposit-welding layer of a tube welding rod according to one embodiment of the present invention.
Figure 2:
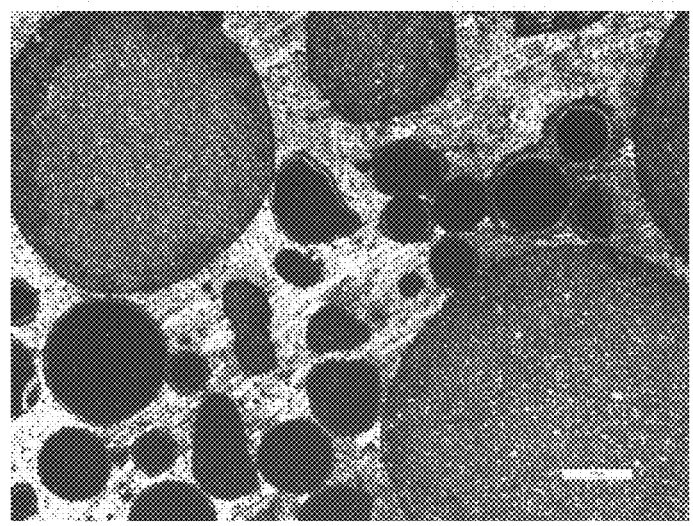
FIG. 2 is a photomicrograph of a stacked welding layer of a tube welding rod according to another embodiment of the present invention.

A tube welding rod is designed and manufactured according to one embodiment of the present invention. A filler of the tube welding rod, by weight percentage, is composed of 88% spherical sintered tungsten carbide particles, 5% spherical cast tungsten carbide particles, 6% alloy powder, and 1% the organic binder. The particle size of the spherical sintered tungsten carbide particles is 16-30 mesh. The particle size of the spherical cast tungsten carbide particles is 60-200 mesh. The particle sizes are determined according to U.S. Standard Sieve Series mesh sizes. The alloy powder is composed of 18% iron, 12% silicon, 48% manganese, 11% niobium, and 11% nickel by weight. The weight percentage of the filler in the tube welding rod is 67%. The welding tube of the tube welding rod is formed by rolling of low carbon steel sheet, and carbon content of the low carbon steel is 0.05-0.11% by weight. Experimental results show that, compared with the related advanced products in the world, the wear resistance of the tube welding rod under high stress measured according to the ASTM B611 standard is improved by 30%, and the wear resistance under low stress measured according to the ASTM G65 standard is improved by more than 10%. Thus, the tube welding rod according to this embodiment of the present invention shows obvious advantages over similar product in the industry.

Embodiment 2

A tube welding rod is designed and manufactured according to one embodiment of the present invention. A filler of the tube welding rod, by weight percentage, is composed of 70% spherical sintered tungsten carbide particles, 25% spherical cast tungsten carbide particles, 4% alloy powder, and 1% organic binder. The particle size of the spherical sintered tungsten carbide particles is 10-30 mesh, and the particle size of the spherical cast tungsten carbide particles is 60-200 mesh. The particle sizes are determined according to U.S. Standard Sieve Series mesh sizes. The alloy powder is composed of 15% iron, 15% silicon, 50% manganese, 10% niobium, and 10% nickel by weight. The weight percentage of the filler in the tube welding rod is 73%. The welding tube of the tube welding rod is formed by rolling of low carbon steel sheet, and carbon content of the low carbon steel is 0.05-0.11% by weight. Experimental results show that, compared with the related advanced products in the world, the wear resistance of the tube welding rod under high stress measured according to the ASTM B611 standard is improved by 40%, and the wear resistance under low stress measured with the ASTM G65 standard is improved by more than 15%. Thus, the tube welding rod according to this embodiment of the present invention shows obvious advantages over similar type of product in the industry.

Embodiment 3

A tube welding rod is designed and manufactured according to one embodiment of the present invention. A filler of the tube welding rod, by weight percentage, is composed of 70% spherical sintered tungsten carbide particles, 13% spherical cast tungsten carbide particles, 12% mechanically crushed cast tungsten carbide particles, 4% alloy powder, and 1% organic binder. The particle size of the spherical sintered tungsten carbide particles is 20-40 mesh, the particle size of the spherical cast tungsten carbide particles is 30-200 mesh.

The particle sizes are determined according to U.S. Standard Sieve Series mesh sizes. The alloy powder is composed of 15% iron, 15% silicon, 50% manganese, 10% niobium, and 10% nickel by weight. The weight percentage of the filler in the tube welding rod is 73%. The welding tube of the tube welding rod is formed by rolling of low carbon steel sheet, and carbon content of the low carbon steel is 0.05-0.11% by weight. Experimental results show that, compared with the related advanced products in the world, the wear resistance of the tube welding rod according to one embodiment of the present invention under high stress measured according to the ASTM B611 standard is improved by 30%, and the wear resistance under low stress measured according to the ASTM G65 standard is improved by more than 15%. Thus, the tube welding rod according to this embodiment of the present invention shows obvious advantages over similar type of products in the industry.

What is claimed is:

1. A tube welding rod resistant to high stress abrasion, comprising:
    a welding tube; and
    a filler filled in the welding tube, comprising 65%-90% of spherical sintered tungsten carbide particles, 5%-30% of spherical cast tungsten carbide particles, 0%-15% of mechanically crushed cast tungsten carbide particles, 2%-6% of alloy powder, and 0.2%-1% of an organic binder by weight, wherein the alloy powder comprises 12%-20% of iron, 10%-16% of silicon, 45%-53% of manganese, 5%-15% of niobium, and 5%-15% of nickel by weight.

2. The tube welding rod of claim 1, wherein particle sizes of the spherical sintered tungsten carbide particles are 10-40 mesh based on U.S. Standard Sieve Series mesh sizes.

3. The tube welding rod of claim 2, wherein the spherical sintered tungsten carbide particles are formed by uniformly mixing tungsten carbide powder with cobalt powder into spherical particles and then sintering the spherical particles, and a weight percentage of cobalt in the spherical sintered tungsten carbide particles is 2%-6%.

4. The tube welding rod of claim 1, wherein particle sizes of the spherical cast tungsten carbide particles are 30-200 mesh based on U.S. Standard Sieve Series mesh sizes.

5. The tube welding rod of claim 4, wherein the spherical cast tungsten carbide particles substantially comprises greater than or equal to 95.00% of tungsten, 3.85%-4.0% of carbon, 0.15-0.50% of iron, 0.10-0.20% of chromium, and 0.10-0.20% of vanadium by weight.

6. The tube welding rod of claim 1, wherein weight percentages of the welding tube and the filler are 20%-35% and 65%-80%, respectively.

7. The tube welding rod of claim 1, wherein the welding tube is formed by rolling of a low carbon steel sheet, and carbon content of the low carbon steel is less than or equal to 0.20% by weight.

8. The tube welding rod of claim 1, wherein the organic binder is a phenolic resin.

9. A tube welding rod resistant to high stress abrasion, comprising:
    a welding tube; and
    a filler filled in the welding tube, comprising 65%-90% of spherical sintered tungsten carbide particles, 5%-30% of spherical cast tungsten carbide particles, 0%-15% of mechanically crushed cast tungsten carbide particles, 2%-6% of alloy powder, and 0.2%-1% of an organic binder by weight,
    wherein particle sizes of the spherical cast tungsten carbide particles are 30-200 mesh based on U.S. Standard Sieve Series mesh sizes; and
    wherein the spherical cast tungsten carbide particles substantially comprises greater than or equal to 95.00% of tungsten, 3.85%-4.0% of carbon, 0.15-0.50% of iron, 0.10-0.20% of chromium, and 0.10-0.20% of vanadium by weight.

* * * * *